(12) United States Patent
Severinski et al.

(10) Patent No.: US 6,386,629 B1
(45) Date of Patent: May 14, 2002

(54) VEHICLE SEAT

(75) Inventors: Paul S. Severinski, Brownstown; Mark E. Rodgers, Washington; Don H. Bernhardt, Walleo Lake, all of MI (US)

(73) Assignee: Lear Corporation, Southfield, MI (US)

(*) Notice: Subject to any disclaimer, the term of this patent is extended or adjusted under 35 U.S.C. 154(b) by 0 days.

(21) Appl. No.: 09/516,537

(22) Filed: Mar. 1, 2000

Related U.S. Application Data

(60) Provisional application No. 60/122,124, filed on Mar. 1, 1999.

(51) Int. Cl.⁷ .................................................. A47C 7/62
(52) U.S. Cl. ........................... 297/188.1; 297/188.09; 297/188.14; 297/236; 297/234; 297/237; 297/113
(58) Field of Search ..................... 297/188.09, 188.1, 297/188.14, 236, 234, 237, 113

(56) References Cited

U.S. PATENT DOCUMENTS

| | | |
|---|---|---|
| 1,356,558 A | 10/1920 | Purcell |
| 2,525,952 A | 10/1950 | Saterlie et al. |
| 2,958,369 A | 11/1960 | Pitts et al. |
| 3,083,998 A | 4/1963 | Morris |
| 3,336,077 A | 8/1967 | Radke et al. |
| 3,336,078 A | 8/1967 | Haley |
| 3,338,629 A | 8/1967 | Drees |
| 3,951,448 A | 4/1976 | Hawie |
| 4,230,366 A * | 10/1980 | Ruda .......................... 297/487 |
| 4,453,759 A | 6/1984 | Kathiria |
| 4,685,729 A | 8/1987 | Heesch et al. |
| 4,690,455 A | 9/1987 | Bailey et al. |
| 4,934,750 A | 6/1990 | Eichler et al. |
| 5,131,716 A | 7/1992 | Kwasnik et al. |
| 5,150,946 A | 9/1992 | Marfilius |
| 5,265,934 A | 11/1993 | Forget |
| 5,286,084 A | 2/1994 | Bart |
| 5,338,081 A * | 8/1994 | Young et al. ............. 297/37.14 |
| 5,390,976 A | 2/1995 | Doughty et al. |
| 5,609,392 A | 3/1997 | Stigson |
| 5,658,043 A * | 8/1997 | Robinson ..................... 297/113 |
| 5,720,514 A * | 2/1998 | Carlsen et al. ........... 297/188.1 |
| 5,868,450 A * | 2/1999 | Hashimoto ................ 296/65.09 |

FOREIGN PATENT DOCUMENTS

| | | |
|---|---|---|
| DE | 30 20 212 A1 | 12/1981 |
| EP | 0597519 A1 * | 10/1993 |
| EP | 0625444 A1 * | 11/1994 |
| FR | 2 615 799 | 12/1988 |
| GB | 2122886 | 1/1984 |

* cited by examiner

Primary Examiner—Peter M. Cuomo
Assistant Examiner—Joseph Edell
(74) Attorney, Agent, or Firm—MacMillan, Sobanski & Todd, LLC

(57) ABSTRACT

A vehicle seat includes a console pivotally mounted on a seat back and a booster seat movable between a stowed positioned and an upright position. The seat includes a seat bottom having first and second portions which define a generally horizontal seating surface. A console is selectively disposed in a recess formed in one of the first and second portions. A first side of the console defines a console seating surface. The console is pivotable between a first position, wherein the console seating surface is generally co-planar with the seating surface of the first and second portions, and a second position, wherein the console is pivoted outwardly from a front edge exposing the second side of the console. A second recess is formed in the seating surface of the seat bottom between the front and rear edges to define a second rear support area located between the rear edge and the second recess. The booster seat is movable between a first position, wherein the booster seat is disposed in the second recess such that a seating surface of the booster seat is generally co-planar with the seating surface of the seat bottom, and a second position, wherein the booster seat is positioned above the rear support area.

18 Claims, 4 Drawing Sheets

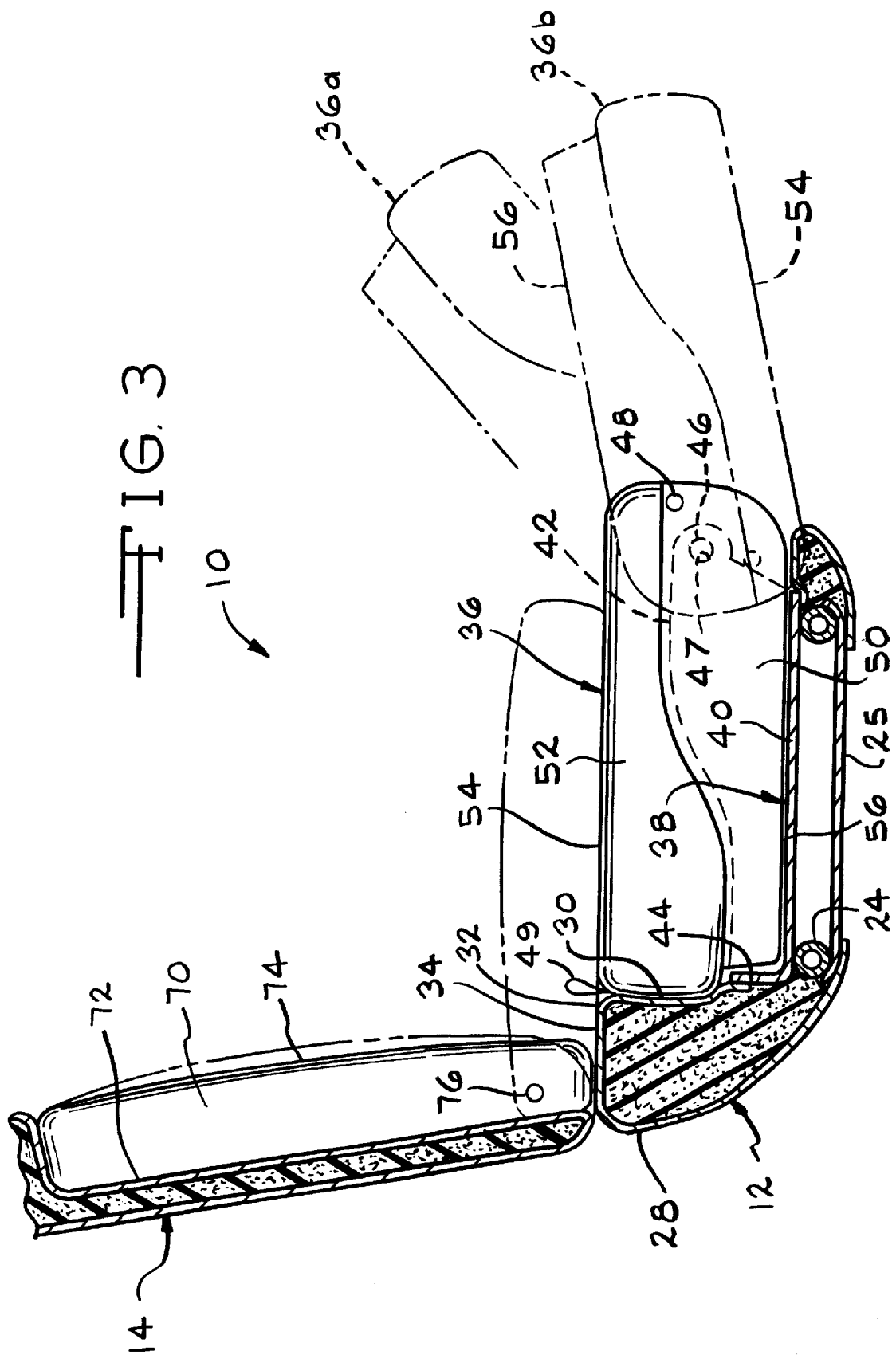

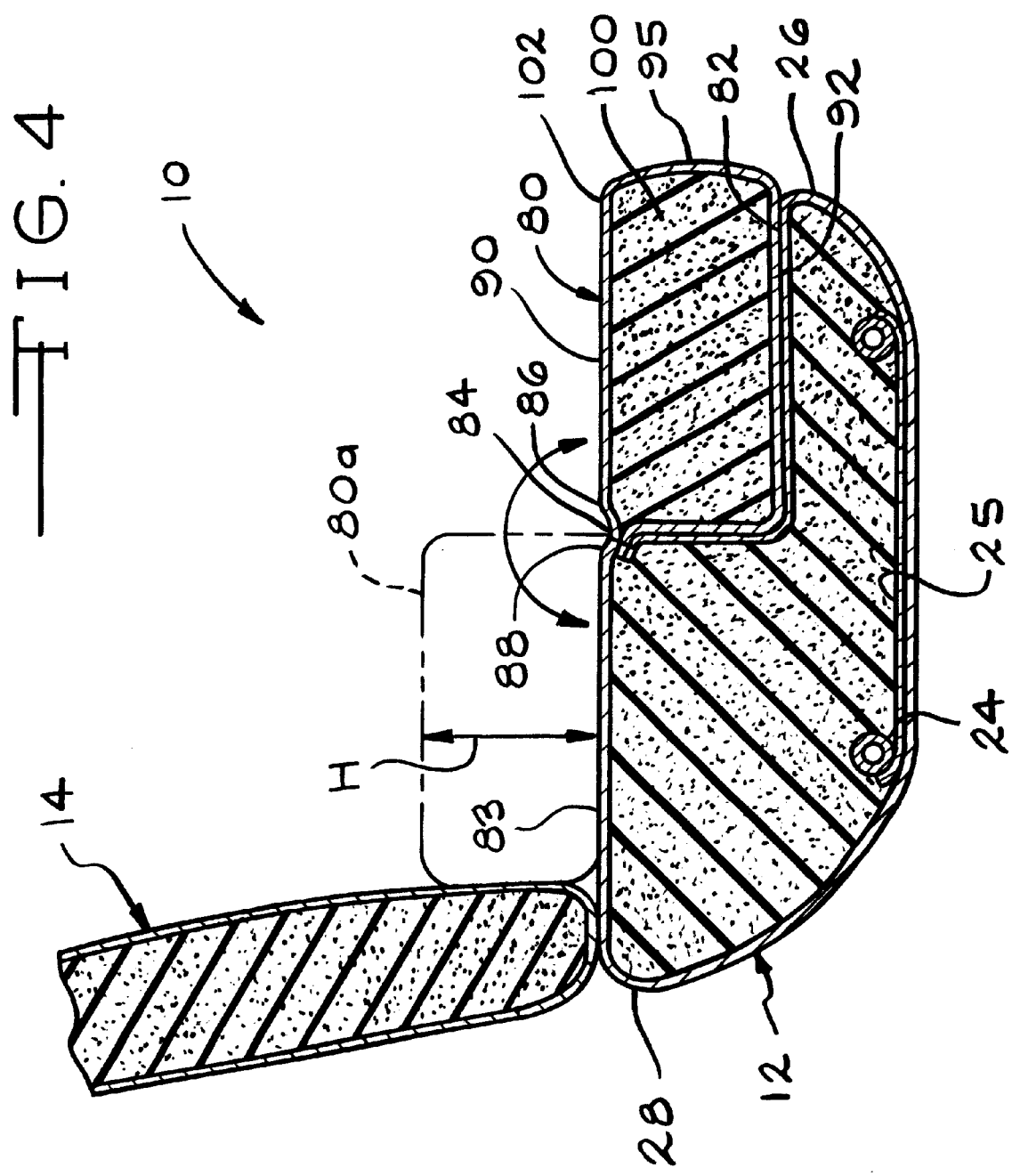

VEHICLE SEAT

CROSS REFERENCE TO RELATED APPLICATIONS

This application claims the benefit of U.S. Provisional Application No. 60/122,124 filed Mar. 1, 1999.

BACKGROUND OF THE INVENTION

This invention relates in general to vehicle seats, and in particular to consoles and child booster seats incorporated therein.

Vehicle seats have a generally horizontal seat bottom and a seat back extending vertically from the rear portion of the seat bottom at a slight angle. Some vehicle seats, such as rear seats of the vehicle, have armrests which are disposed in a recess formed in the seat back and are pivotally mounted therein. The armrests are movable between a stowed position within the recess of the seat back, to an extended position, in which the armrests pivots downwardly from the seat back to a generally horizontal position above the seat bottom. When the armrest is moved to its lowered position, an upper surface of the generally horizontal armrest is exposed. It has been known to include features, such as cup holders and storage compartments, built into this upper surface to be used by the occupants of the rear seat. However, since the length of the armrest is dependent on the length of the recess of the seat back, and the height of the seat back is generally not that large, the upper surface of the armrest is positioned adjacent the sides of the occupants of the seat and not general in front of the occupants. This side positioning of the armrest can be awkward for the occupants to use some of the features of the armrest.

Some vehicle seats are equipped with integral child seats, having a panel disposed in the recess of the seat back which is rotated to a generally horizontal position to provide a seating surface for the child. The exposed vertical portion of recess of the seat back provides the back support surface for the child. The child is then typically restrained in the seats by additional restraint belts housed within the recess. These child seats are relatively expensive to manufacture and are designed for relatively young and small children. For older and larger children, it is known to provide a booster seat movable to an elevated position to increase the height of the child for better placement of conventional shoulder restraint belts, such as disclosed in U.S. Pat. No. 5,609,392 issued on Mar. 11, 1997 and U.S. Pat. No. 5,265,934 issued on Nov. 30, 1993. However, these booster seats include complicated linkages and actuating members which can be relatively expensive to manufacture and install.

BRIEF SUMMARY OF THE INVENTION

This invention relates to a vehicle seat which preferably includes a console pivotally mounted on a seat back and extendable to a position outwardly from the front edge of the seat bottom. This invention also relates to a vehicle seat preferably including a booster seat movable from a stowed positioned within a recess of a seat bottom to an upright position positioned above a rear support area of the seating surface of the seat bottom behind the recess.

The vehicle seat of the present invention preferably includes a seat bottom having first and second portions which define a generally horizontal seating surface, a front edge, and a rear edge. Preferably, a common frame member extends through the first and second portions. A console is selectively disposed in a recess formed in one of the first and second portions. The console has a first side and a second side opposite the first side. The first side defines a console seating surface. The console is pivotable between a first position, wherein the console seating surface is generally co-planar with the seating surface of the first and second portions, and a second position, wherein the console is pivoted outwardly from the front edge exposing the second side of the console. Preferably, the recess extends toward the rear edge to a mid-point of the seating surfaces to define a rear support area of the seat bottom.

The vehicle seat of the present invention preferably includes a second recess formed in the seating surface of the seat bottom between the front and rear edges to define a second rear support area located between the rear edge and the second recess. A booster seat, having a seating surface, is movable between a first position, wherein the booster seat is disposed in the second recess such that the seating surface of the booster seat is generally co-planar with the seating surface of the seat bottom, and a second position, wherein the booster seat is positioned above the rear support area.

Various objects and advantages of this invention will become apparent to those skilled in the art from the following detailed description of the preferred embodiment, when read in light of the accompanying drawings.

BRIEF DESCRIPTION OF THE SEVERAL VIEWS OF THE DRAWING

FIG. 3 is a side sectional view taken along lines 3—3 of FIG. 1 generally through the armrest and console.

FIG. 4, is a side sectional view taken along lines 4—4 of FIG. 1 generally through the booster seat.

DETAILED DESCRIPTION OF THE INVENTION

Figure 1:
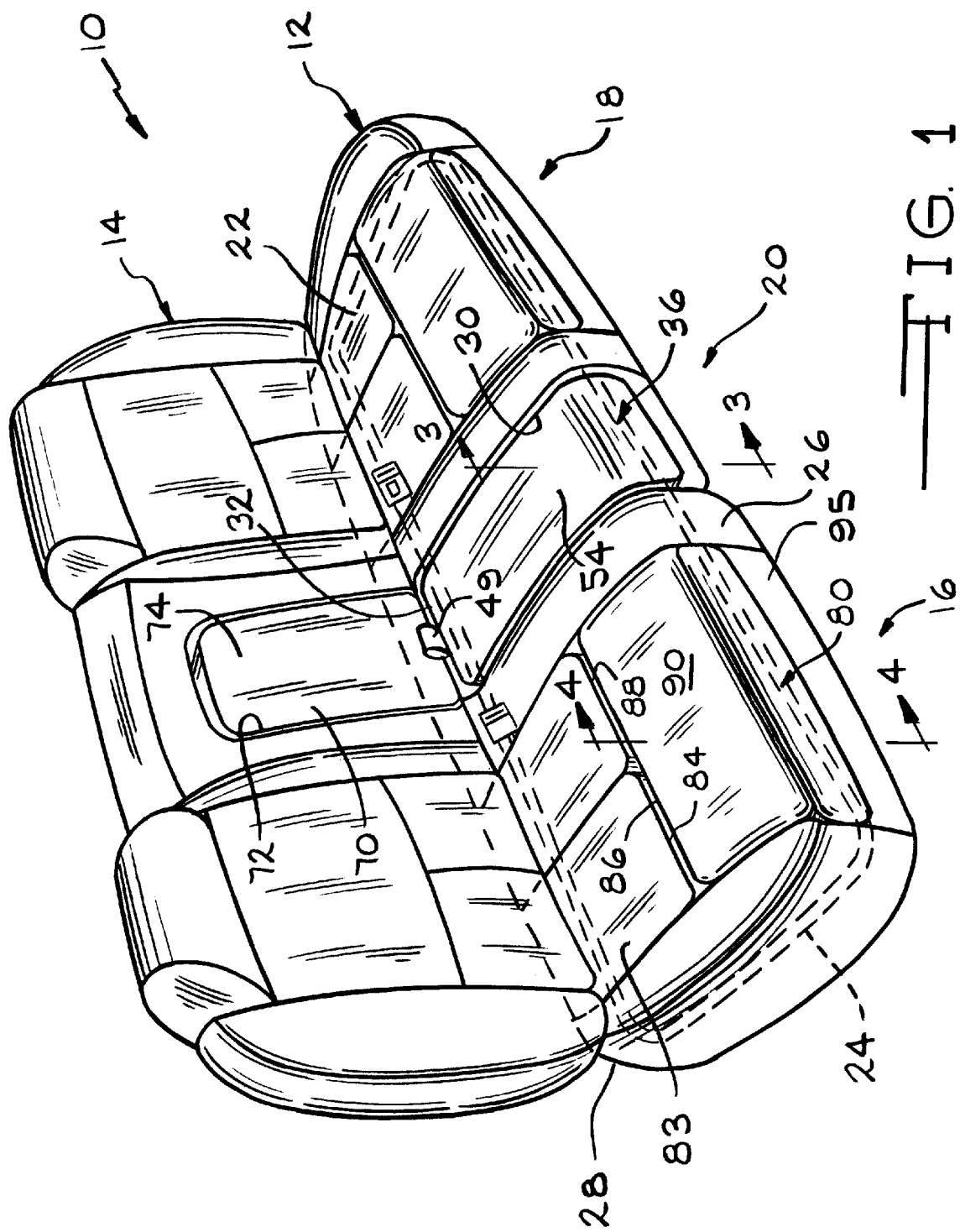
FIG. 1 is perspective view of a vehicle seat in accordance with the present invention, wherein the console is in its retracted position, the armrest is in its stowed position, and the booster seat is in its stowed position.

There is illustrated in FIGS. 1 through 4, a vehicle seat, indicated generally at 10, in accordance with the present invention. The seat 10 is preferably a bench-type vehicle seat having a seat bottom 12 and a seat back 14. The seat back 12 extends upwardly from a rear portion of the seat bottom 12. The seat 10 has corresponding first, second, and intermediate seating portions, indicated generally at 16, 18, and 20, for the seating of three occupants. The seat bottom 12 and the seat back 14 can be made of any suitable material, such as a framework to provide rigidity, and foam padding covered by a trim material.

The seat bottom 12 has a generally horizontal top surface 22 generally extending across the entire upper surface of the first, second, and intermediate seating portions 16, 18, and 20. The top surface 22 defines a seating surface for the seat bottom 12. The seating surface of the seat bottom 12 can be relatively flat or contoured to any desired shape.

Preferably, the seat bottom 12 has a common support frame, shown schematically at 24 in FIG. 1, which extends through the first, second, and intermediate seating portions 16, 18, and 20. The frame 24 can be any suitable structure and shape for supporting and providing rigidity to the seat bottom 12. For example, the frame 24 can have a generally rectangular shape, as shown in FIG. 1, made of metal tubing. The frame 24 may also have cross members 25, as shown in FIGS. 3 and 4, for added rigidity. The frame 24 or cross members 25 may also be formed of a contoured pan or stamped sheet. If desired, the seat bottom 12 and/or the seat back 14 could be divided into a split seat, such as a conventionally known 60/40 split rear seat (wherein the seat back 14 is split between one portion having about 60 percent of the width of the seat back, and the other portion having 40 percent of the width). For example, the intermediate portion 20 of the seat bottom 12 or seat back 14 could be attached to one of the first and second portions 16 and 18 with a common frame member (not shown) extending therethrough. The seat backs 14 of the split portions 16, 18, and 20 can be pivotally movable relative therebetween so that one portion pivots relative to the other portion to provide, for example, access to a rear compartment area (not shown) of the vehicle in which the seat 10 is installed. Each of the 60/40 split portions could have frame structures pivotally connected to a common frame member extending along the entire seat bottom 12.

Figure 2:
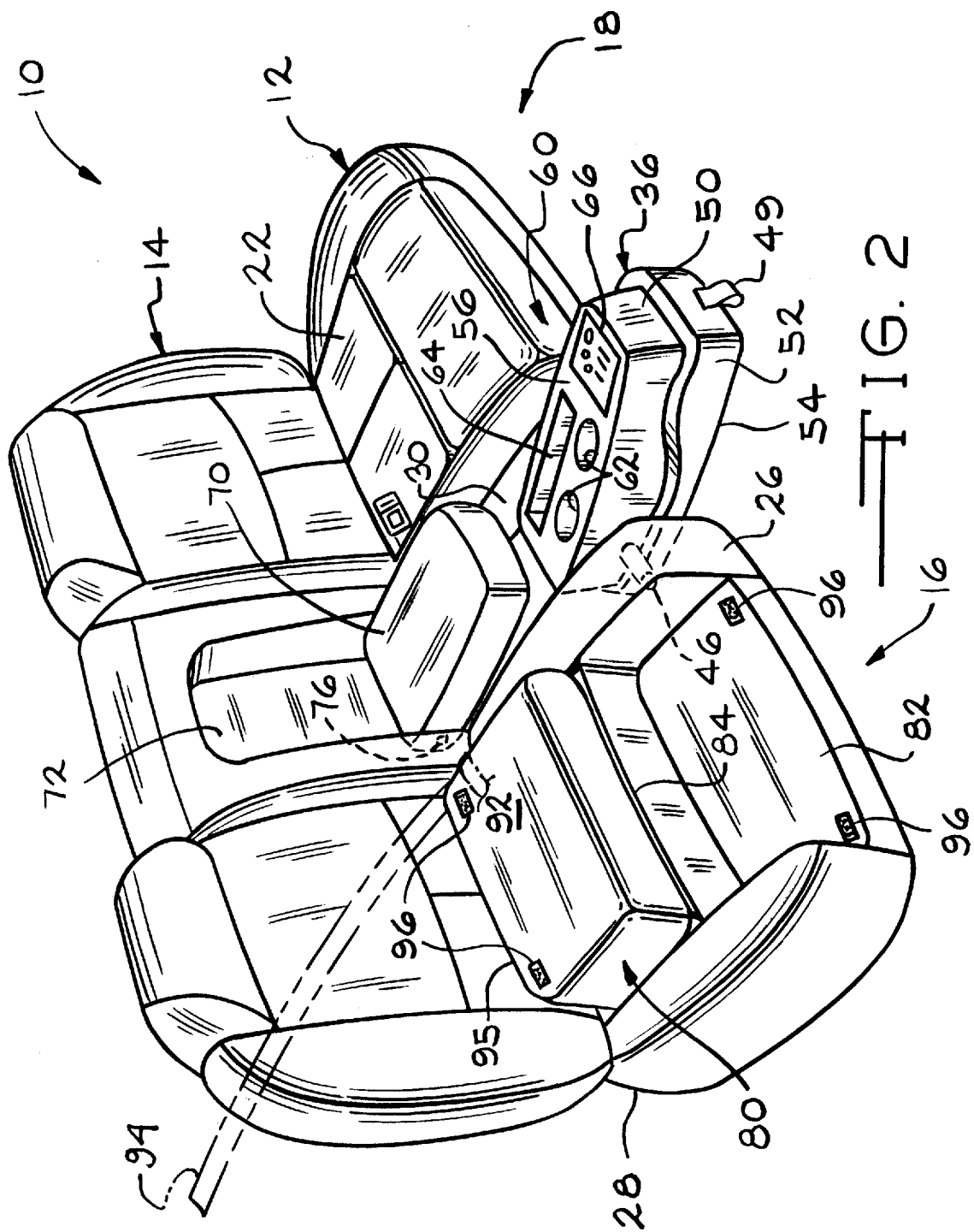
FIG. 2 is a perspective view of the seat illustrated in FIG. 1, wherein the console is in its extended position, the armrest is in its lowered position, and the booster seat is in its upright position.

As shown in FIGS. 1 through 3, the seat bottom 12 defines a front edge 26 and a rear edge 28. The front and rear edges 26 and 28 generally extend along the entire width of the seat bottom 12 across the first, second, and intermediate seating portions 16, 18, and 20. The intermediate seating portion 20 of the seat bottom 12 has a recess 30 formed therein. As described in detail below, a console 36 is disposed in the recess 30. As best shown in FIG. 3, the recess 30 extends to the front edge 26 forming a notch in the seating surface of the intermediate portion 20 and the front edge 26. The recess 30 could also be formed such that the recess 30 does not extend to the front edge 26, thereby defining a web portion (not shown) integral with the intermediate seating portion 20 between the recess 30 and the front is edge 26. The recess 30 can extend vertically through the seat bottom 12 or can extend partially through the top of the seating surface 22. As shown in FIG. 3, the recess 30 preferably extends towards the rear edge 28 to a mid-point 32 of the seating surface 22 of the seat bottom 12, thereby defining a rear support area 34 of the intermediate portion 20 of the seat bottom 12. The rear support area 34 is generally located between the rear edge 28 and the mid-point 32 of the seating surface 22. The size of the rear support area 34 and the location of the mid-point 32 can be configured to any suitable dimensions. Thus, the mid-point 32 can be at any suitable position between the front and rear edges 26 and 28.

Disposed within the recess 30 of the seat bottom 12 is the console, indicated generally at 36. The console 36 is pivotally mounted on the seat bottom 12. As discussed in greater detail below, the console 36 is pivotable between a retracted position, as shown in FIG. 1, and an extended position, as shown in FIG. 2, such that at least a portion of the console 36 extends outwardly from the front edge 26 of the seat bottom 12. In FIG. 3, the console 36 is shown in its retracted position in solid lines, and shown in a first extended position, indicated by phantom lines 36a, and in a second extended position, indicated by phantom lines 36b. As will be discussed below, the console 36 can be rotated or pivoted to any suitable extended position.

The console 36 can be pivotally mounted within the recess 30 by any suitable means. As shown in FIG. 3, the seat bottom 12 preferably includes a framework or basket 38 which lines the bottom and walls of the recess 30. The basket 38 includes a bottom panel 40, a pair of upwardly extending side walls, indicated by hidden lines 42, and a rear end panel 44. The basket 38 can include a front end panel (not shown) if the recess 30 does not extend to the front edge 26 of the seat bottom 12. The basket 38 can be made of any suitable material, such as plastic. Preferably, the basket 38 is attached to the seat bottom 12. The console 36 can be pivotally mounted to seat bottom 12 by any suitable means, such as by a pair of pins 46 (one shown in FIGS. 2 and 3) fastened to the console 36 and disposed in sockets 47 formed in the side walls 42 of the basket 38. Preferably, a stop 48 is incorporated between the console 36 and the basket 38, to retain the console 36 at a desired rotational position when the console 36 is in its extended position. As shown in FIG. 3, the stop 48 can be a pin extending outwardly from the body 50 of the console 36 which engages the side wall 42 of the basket 38. Of course, the stop can be any suitable structure. Preferably, the stop 48 prevents the console 36 from pivoting beyond 180 degrees of rotation from the retracted position to the extended position, for example, until the console 36 reaches the positions 36a or 36b as shown in FIG. 3. If the console 36 is pivoted less than 180 degrees, the console 36 will be at a slight obtuse angle relative to the seating surface of the seat bottom 12 and be directed closer to the occupants of the seat 10. A strap 49 is attached to the console 36 to assist in grasping the console 36 to move the console 36 from its retracted position to its extended position.

The console 36 preferably includes a relatively rigid body 50 and padding 52. The body 50 can be made of any suitable material, such as plastic. The padding 52 can be made of any suitable material, such as foam and trim material. The console 36 has a first side 54 and a second side 56 opposite the first side 54. The first side 54 defines a seating surface which is generally co-planar with the seating surface 22 when the console is in the retracted position, such as shown in FIG. 1. It should be understood that the term "coplanar" is a relative term describing a generally flush relationship between the seating surfaces 22 and 40. Of course, the seating surfaces 22 and 40 do not have to be flat, but can have any suitable contoured shape. The first side 54 includes the padding 52 to provide a relatively comfortable seating position for an occupant. The padding 52 of the console 36 can be covered or trimmed with a similar trim material used on the seat bottom 12.

Pivoting movement of the console 36 from its retracted position to its extended position exposes the second side 56 which preferably includes a utility bin, indicated generally at 60. The console 36 is pivoted outwardly from the front edge 26 of the seat bottom so that the bin 60 is at a position generally in front of the occupants of the seat 10 to provide easy access to the bin 60. The bin 60 is preferably formed from the body 50. The utility bin 60 can include any suitable features or items useful for the occupants of the seat 10. For example, as shown in FIG. 2, the bin 60 may include cupholder stations 62 or covered storage compartments 64. The bin 60 can also include an electronic control panel 66 for controlling sound systems, heating and ventilation systems, seating systems, and any other electrically controlled system. The wiring of the electronic control panel 66 could be extended through passageways (not shown) formed through the pins 46.

Preferably, the seat back 14 includes an armrest 70 pivotally attached thereto. The armrest 70 is movable from a raised or stowed position, as shown in FIG. 1, to a lowered position, as shown in FIG. 2, extending partially outwardly from the recess 72. The armrest 70 is disposed in a recess 72 formed in the seat back 14 when the armrest 70 is in its stowed position. The armrest 70 has a seating surface 74 which is preferably flush or coplanar with the seating surface of the seat back 14 to provide a seating position for an occupant. The surface 74 of the armrest 70 can also be padded and trimmed with similar material as the seat bottom 12, seat back 14, and the console 36. The armrest 70 can be pivotally attached to the seat back 14 by any suitable manner, such as by a pair of pins 76 disposed in cooperating sockets (not shown), similar to the pivotal connection of the console 36, as described above. Preferably, the size or length of the armrest 70 is such that it generally covers the exposed portion of the recess 30 while the console 36 is in the extended position, as shown in FIGS. 2 and 3.

Referring to FIGS. 1, 2, and 4, the seat 10 may also include a child booster seat, indicated generally at 80, in accordance with the present invention. The seat 10 can have any suitable number of booster seats 80. For example, the embodiment of the seat 10 includes a booster seat 80 at each of the first and second portions of the seat 10. The booster seat 80 is pivotally connected to the seat bottom 12 and is movable between a stowed position, as shown in FIG. 1, and an upright position, as shown in FIG. 2 and by phantom lines 80a in FIG. 4. While in its stowed position, the booster seat 80 is disposed within a recess 82 formed in the seating surface of the seat bottom 12. A rear support area 83 of the seating surface of the seat bottom 12 is defined between recess 82 and the rear edge 28 of the seat bottom 12. As shown in FIG. 2, the recess 82 extends to the front edge 26 forming a notch in the seating surface of the seat bottom 12. The recess 82 could also be formed such that the recess 82 does not extend to the front edge 26, thereby defining a web portion (not shown) integral with the first or second seating portions 16 and 18 between the recess 82 and the front edge 26. When in the upright position, the booster seat 80 is positioned above and on top of the rear support area 83.

The booster seat 80 can be pivotally connected to the seat bottom 12 by any suitable means, such as for example, by a hinge 84. Preferably, the hinge 64 is attached to an upper edge 86 of the booster seat 80 and an edge 88 of the seat bottom 12 adjacent the rear top portion of the recess 82. Preferably, the hinge 84 extends along the entire width of the edges 86 and 88. The hinge 64 can be any suitable structure, such as fabric, leather, or other trim material sewn to the booster seat 80 and the seat bottom 12. For example, the hinge 84 can be an extension of a flexible trim material covering the seat bottom 12 and the booster seat 60, as shown in FIG. 4.

The booster seat 60 has a first seating surface 90 which is preferably flush or coplanar with the seating surface 22 and the rear support area 83 of the seat bottom 12 when the booster seat 80 is in its stowed position. Generally, the first seating surface 90 of the booster seat 80 provides a seating position for the legs of an adult occupant of the seat 10. When the booster seat 80 is in its upright position, a second seating surface 92 of the booster seat 80 is exposed, as shown in FIG. 2. The booster seat 80 is ideally suited for providing a seating position for a child occupant of the seat 10. The child occupant sits on the second seating surface 92 and the exposed recess 82 of the seat bottom 12 functions as a foot well to provide room for the feet of the child occupant. The booster seat 80 can provide a better seating position for a child occupant because the height of the child occupant is raised by a distance H, as shown in FIG. 4, generally corresponding to the height of the booster seat 80. The increase in height can better position a safety strap or shoulder harness 94 across the central or lower chest region of a child occupant as opposed to the upper chest, neck, or head region. Preferably, an edge 95 of the booster seat 80 is adjacent to and contacting the seating surface of the seat back 14 when the booster seat 80 is in its upright position. The foam material adjacent the edge 95 of the booster seat 80 may be compressed to form a relatively tight fit and help prevent any gap from forming between the edge 95 and the seating surface of the seat back 14.

By using a hinge 84 made of trim material, the booster seat 80 can be easily manually flipped or rotated about 180 degrees about the hinge 84 between its stowed and upright positions. The booster seat 80 can be provided with a latch or fastener to retain the booster seat 80 in the recess 82 when the booster seat is in its stowed position. For example, strips of hook and loop fasteners 96 can be attached to the booster seat 80 and the contacting surfaces of the recess 82.

The booster seat 80 can be any suitable structure, such as for example, a foam pad 100 covered by a layer of trim material 102. The foam pad 100 and the trim material 102 are preferably the same foam and trim material used for the remainder of the seat 10.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A vehicle seat comprising:
   a continuous seat bottom having first and second seat portions defining a generally horizontal seating surface, a front edge, and a rear edge, said seat bottom having a recess formed in said seating surface of one of said first and second seat portions between said front and rear edges, said recess extending toward said rear edge to a mid-point of said seating surface, thereby defining a rear support area between said rear edge and said midpoint of said seating surface;
   a common frame member extending through said first and second seat portions; and
   a console selectively disposed in said recess, said console having a first side and a second side opposite said first side, said first side defining a console seating surface, said console being pivotable between a first position, wherein said console seating surface is generally co-planar with said seating surface of said seat bottom, and a second position, wherein said console is pivoted outwardly from said front edge of said seat bottom exposing said second side of said console.

2. The seat of claim 1 further including a seat back extending upwardly from seat bottom above said rear support area, said seat back having an armrest selectively disposed in a recess formed in said seat back, said armrest pivotally attached to seat back such that said armrest is pivotable between a first position, wherein said armrest is disposed in said recess of said seat back, and an extended position, wherein said armrest is pivoted partially outwardly from said recess of said seat back to a position generally above said recess formed in said seat bottom.

3. The seat of claim 2, wherein when said armrest is in said extended position, said armrest substantially covers an exposed portion of said recess of said seat bottom defined between said midpoint to an edge of said console located within said recess of said seat bottom when said console is in said extended position.

4. The seat of claim 1, wherein said console includes a stop preventing said console from pivoting beyond 180 degrees of rotation when pivoting from said first position to said second position.

5. The seat of claim 1, wherein said second side of said console includes a utility bin which is exposed when said console is in said extended position.

6. The seat of claim 5, wherein said bin includes features selected from the group consisting of cupholders, storage compartments and electronic controls.

7. The seat of claim 1, wherein said recess formed in said seating surface extends to said front edge of said seat bottom.

8. The seat of claim 1, wherein said seat bottom further defines a third seat portion such that said second seat portion is positioned between said first and third seating portions, and wherein said console is disposed in said recess formed in said second seat portion.

9. A vehicle seat for supporting an adult and a child occupant, said seat comprising:

a seat back defining an upright generally vertical surface for support of a back of an adult or child occupant of said seat;

a seat bottom generally defining a horizontal seating surface, a front edge, and a rear edge, said seat bottom having a recess formed in said seating surface between said front and rear edges, said seat bottom further defining a rear support area of said seating surface located between said rear edge and said recess; and a booster seat having a seating surface, said booster seat movable between a first position, wherein said booster seat is disposed in said recess such that said seating surface of said booster seat is generally co-planar with said seating surface of said seat bottom, and a second position, wherein said booster seat is positioned above and on top of said rear support area, and wherein said vertical surface of said seat back remains in a fixed relation relative to said seat bottom for support of a back of an adult or child occupant regardless of whether said booster seat is in said first or second position, and wherein said booster seat is pivotally attached to said seat bottom by a hinge connected to said first seating surface of said booster seat and an edge said rear support area adjacent said recess.

10. The seat of claim 9, wherein said recess formed in said seating surface extends to said front edge of said seat bottom.

11. The seat of claim 9, wherein said seating surface of said booster seat faces and is positioned against said rear support area when said booster seat is in said second position.

12. The seat of claim 9, wherein said hinge is made of a fabric material.

13. The seat of claim 9, wherein said hinge is made of a trim material covering one of said seating surfaces of said booster seat and said seat bottom.

14. The seat of claim 9, wherein said booster seat is movable between said first and second positions by rotating the booster seat approximately 180 degrees about said hinge so that said seating surface of said booster seat faces and is positioned against said rear support area when said booster seat is in said second position.

15. The seat of claim 9 further including a seat back extending upwardly from said rear edge of said seat bottom, said booster seat having an edge generally flush with said front edge of said seat bottom when said booster seat is in said first position, said edge of said booster seat adjacent said seat back when said booster seat is in said second position.

16. The seat of claim 9, wherein said booster seat is retained in said recess when said booster seat is in said first position by a fastener attached to said booster seat and said seat bottom.

17. The seat of claim 16, wherein said fastener is a hook and loop fastener.

18. The seat of claim 9, wherein said booster seat is comprised of a foam pad and trim material covering said foam pad.

\* \* \* \* \*